US 6,676,140 B1

(12) United States Patent
Gondobintoro (10) Patent No.: US 6,676,140 B1
(45) Date of Patent: Jan. 13, 2004

(54) EXPANDABLE STROLLER

(76) Inventor: Darnell M. Gondobintoro, 11630 Moraga La., Los Angeles, CA (US) 90049

(*) Notice: Subject to any disclaimer, the term of this patent is extended or adjusted under 35 U.S.C. 154(b) by 7 days.

(21) Appl. No.: 10/126,885

(22) Filed: Apr. 19, 2002

(51) Int. Cl.[7] .............................. B62B 7/08; B62B 9/10
(52) U.S. Cl. ................. 280/33.993; 280/642; 280/643; 280/647; 280/648; 280/650; 280/657; 280/47.4
(58) Field of Search .................... 280/657, 30, 33.993, 280/638, 642, 643, 644, 647, 648, 650, 654, 658, 47.38, 47.4; 297/243, 244, 245, 233, 234, 236, 257

(56) References Cited

U.S. PATENT DOCUMENTS

| | | | | |
|---|---|---|---|---|
| 2,769,482 A | * | 11/1956 | Carlson .................... | 280/47.35 |
| 2,857,953 A | * | 10/1958 | Berger et al. ............. | 280/47.35 |
| 2,993,702 A | * | 7/1961 | Gill ............................ | 280/643 |
| 3,235,279 A | * | 2/1966 | Smith et al. ................ | 280/648 |
| 3,309,101 A | * | 3/1967 | Romay ..................... | 280/47.38 |
| 3,330,575 A | * | 7/1967 | Boudreau ................... | 280/648 |
| 3,738,700 A | * | 6/1973 | Terry ........................ | 296/97.21 |
| 4,725,071 A | | 2/1988 | Shamie | |
| 5,018,754 A | * | 5/1991 | Cheng ....................... | 280/47.4 |
| D321,850 S | * | 11/1991 | Mong-Hsing .............. | D12/129 |
| 5,263,730 A | * | 11/1993 | Roach et al. .............. | 280/47.4 |
| 5,338,096 A | * | 8/1994 | Huang ....................... | 297/243 |
| 5,417,449 A | | 5/1995 | Shamie | |
| D359,937 S | | 7/1995 | Yoshie et al. | |
| 5,653,460 A | | 8/1997 | Fogarty | |
| 5,664,795 A | | 9/1997 | Haung | |
| 5,911,432 A | | 6/1999 | Song | |
| 6,045,145 A | * | 4/2000 | Lan .......................... | 280/47.38 |
| 6,068,087 A | * | 5/2000 | Moncini ..................... | 187/252 |
| 6,378,892 B1 | * | 4/2002 | Hsia .......................... | 280/650 |

* cited by examiner

Primary Examiner—Brian L. Johnson
Assistant Examiner—Bridget Avery (57) ABSTRACT

An expandable stroller includes a frame assembly that has a front portion and a rear portion. The front portion is slidably coupled to the rear portion such that a length of the frame assembly is adustable. A first seat member is coupled to the front portion of the frame assembly. A second seat member is coupled to the rear portion of the frame assembly. The second seat member is for supporting a second child in a seated position when the user puts the second child in the second seat member when the frame assembly is extended to full length. The first seat member is positionable adjacent the second seat member when the front portion of the frame assembly is slid with respect to the rear portion of the frame assembly such that the frame assembly is for only accommodating one child.

19 Claims, 5 Drawing Sheets

EXPANDABLE STROLLER

BACKGROUND OF THE INVENTION

1. Field of the Invention

The present invention relates to strollers and more particularly pertains to a new expandable stroller for allowing a user to easily expand the stroller to accommodate one or two children.

2. Description of the Prior Art

The use of strollers is known in the prior art. More specifically, strollers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,911,432; U.S. Pat. No. 5,653,460; U.S. Pat. No. 5,417,449; U.S. Pat. No. 4,725,071; U.S. Pat. No. 5,664,795; and U.S. Pat. No. Des. 359,937.

While these devices fulfill their respective, particular objectives and requirements, the aforementioned patents do not disclose a new expandable stroller. The inventive device includes a frame assembly that has a front portion and a rear portion. The front portion is slidably coupled to the rear portion such that a length of the frame assembly is adjustable. A first seat member is coupled to the front portion of the frame assembly. The first seat member is adapted for supporting a child in a seated position when a user puts the child in the first seat member. A second seat member is coupled to the rear portion of the frame assembly. The second seat member is adapted for supporting a second child in a seated position when the user puts the second child in the second seat member when the frame assembly is extended to full length. The first seat member is positionable adjacent the second seat member when the front portion of the frame assembly is slid with respect to the rear portion of the frame assembly such that the frame assembly is adapted for only accommodating one child.

In these respects, the expandable stroller according to the present invention substantially departs from the conventional concepts and designs of the prior art, and in so doing provides an apparatus primarily developed for the purpose of allowing a user to easily expand the stroller to accommodate one or two children.

SUMMARY OF THE INVENTION

In view of the foregoing disadvantages inherent in the known types of strollers now present in the prior art, the present invention provides a new expandable stroller construction wherein the same can be utilized for allowing a user to easily expand the stroller to accommodate one or two children.

The general purpose of the present invention, which will be described subsequently in greater detail, is to provide a new expandable stroller apparatus and method which has many of the advantages of the strollers mentioned heretofore and many novel features that result in a new expandable stroller which is not anticipated, rendered obvious, suggested, or even implied by any of the prior art strollers, either alone or in any combination thereof.

To attain this, the present invention generally includes a frame assembly that has a front portion and a rear portion. The front portion is slidably coupled to the rear portion such that a length of the frame assembly is adjustable. A first seat member is coupled to the front portion of the frame assembly. The first seat member is adapted for supporting a child in a seated position when a user puts the child in the first seat member. A second seat member is coupled to the rear portion of the frame assembly. The second seat member is adapted for supporting a second child in a seated position when the user puts the second child in the second seat member when the frame assembly is extended to full length. The first seat member is positionable adjacent the second seat member when the front portion of the frame assembly is slid with respect to the rear portion of the frame assembly such that the frame assembly is adapted for only accommodating one child.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and is practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new expandable stroller apparatus and method which has many of the advantages of the strollers mentioned heretofore and many novel features that result in a new expandable stroller which is not anticipated, rendered obvious, suggested, or even implied by any of the prior art strollers, either alone or in any combination thereof.

It is another object of the present invention to provide a new expandable stroller, which may be easily and efficiently manufactured and marketed.

It is a further object of the present invention to provide a new expandable stroller, which is of a durable and reliable construction.

An even further object of the present invention is to provide a new expandable stroller which is susceptible of a low cost of manufacture with regard to both materials and labor, and which accordingly is then susceptible of low prices of sale to the consuming public, thereby making such expandable stroller economically available to the buying public.

Still yet another object of the present invention is to provide a new expandable stroller, which provides in the apparatuses and methods of the prior art some of the advantages thereof, while simultaneously overcoming some of the disadvantages normally associated therewith.

Still another object of the present invention is to provide a new expandable stroller for allowing a user to easily expand the stroller to accommodate one or two children.

Still another object of the present invention is to provide a new expandable stroller for allowing the stroller to be collapsed to accommodate one child and reduce the bulkiness of the two seat stroller.

Yet another object of the present invention is to provide a new expandable stroller, which includes a frame assembly that has a front portion and a rear portion. The front portion is slidably coupled to the rear portion such that a length of the frame assembly is adjustable. A first seat member is coupled to the front portion of the frame assembly. The first seat member is adapted for supporting a child in a seated position when a user puts the child in the first seat member. A second seat member is coupled to the rear portion of the frame assembly. The second seat member is adapted for supporting a second child in a seated position when the user puts the second child in the second seat member when the frame assembly is extended to full length. The first seat member is positionable adjacent the second seat member when the front portion of the frame assembly is slid with respect to the rear portion of the frame assembly such that the frame assembly is adapted for only accommodating one child.

Still yet another object of the present invention is to provide a new expandable stroller that would eliminate the need to buy and tote around both a one-seat stroller and a two-seat stroller, as the number of seats needed is often unpredictable.

Even still another object of the present invention is to provide a new expandable stroller that would allow two children to ride together, unlike one-seat strollers thus making it more convenient than trying to push two children in separate strollers.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
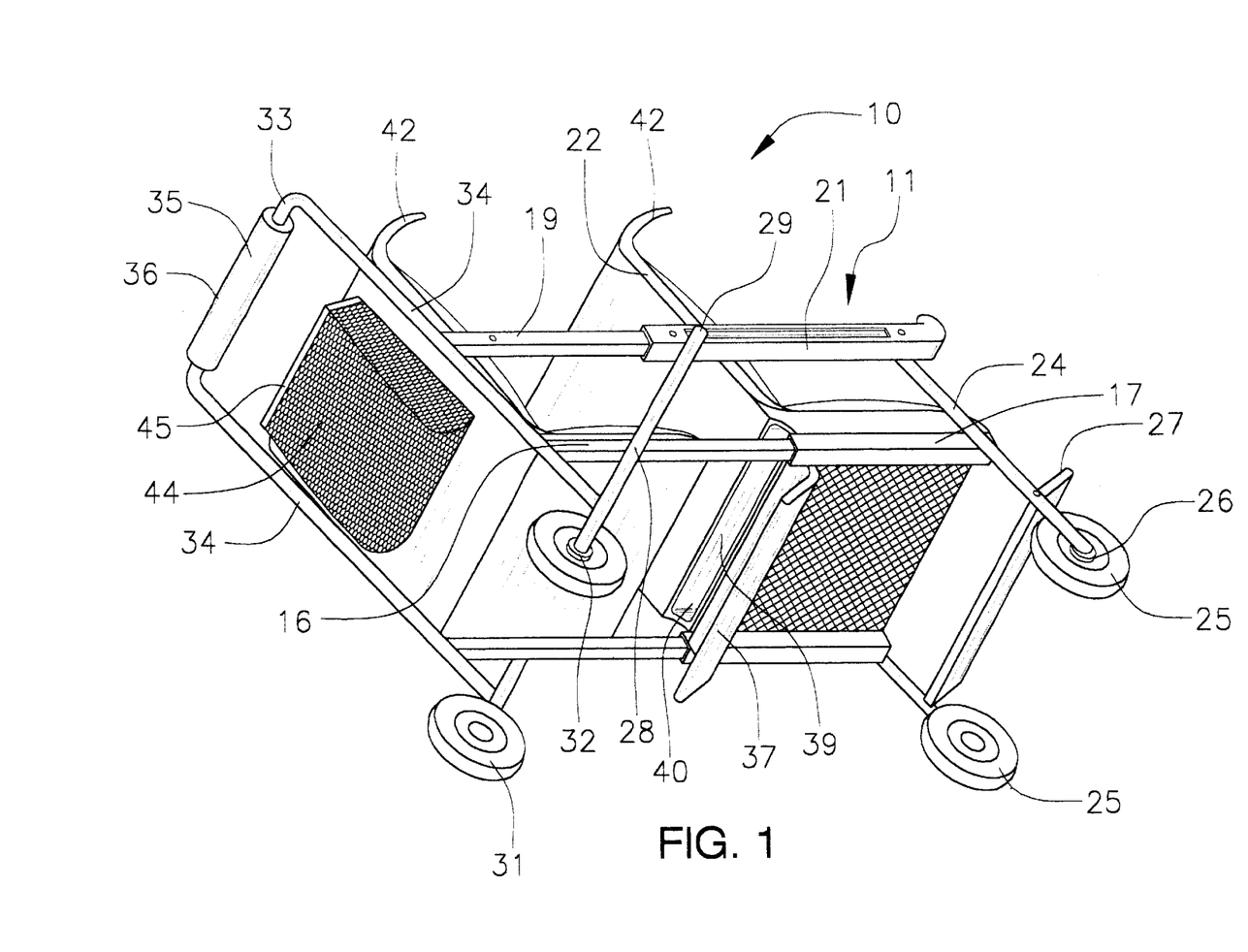
FIG. 1 is a perspective view of a new expandable stroller according to the present invention.
Figure 2:
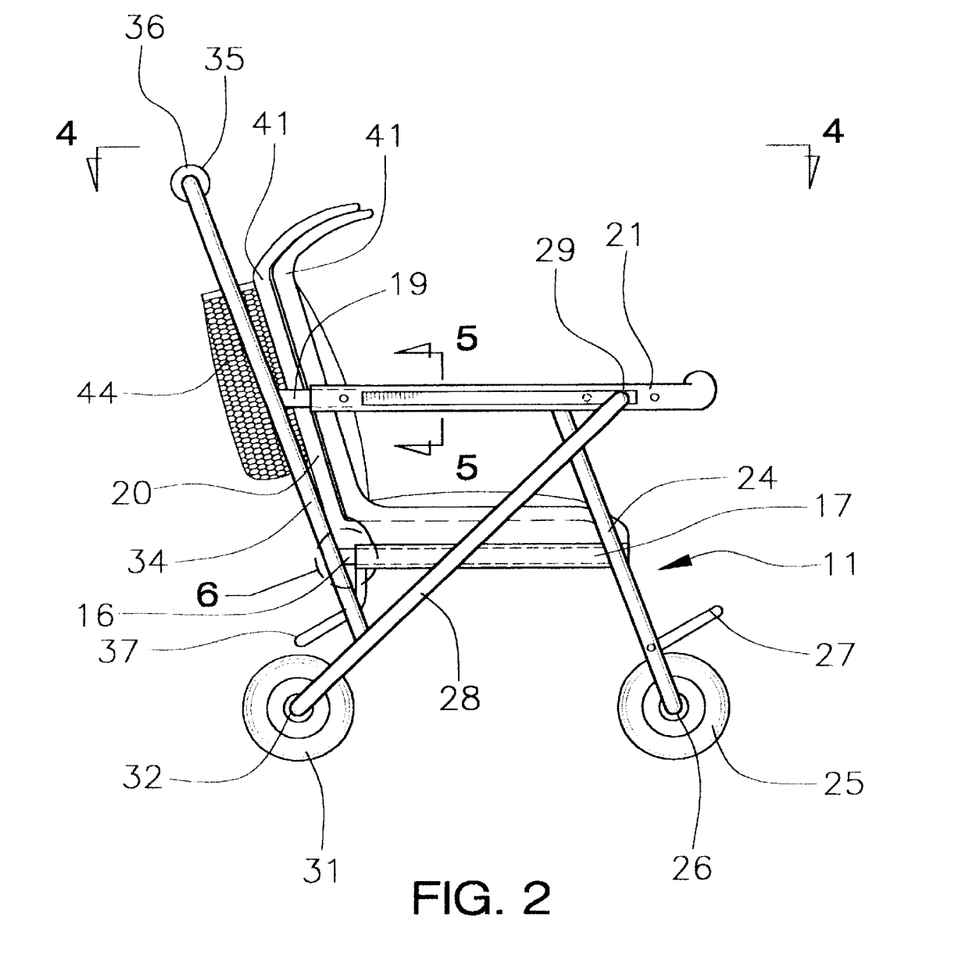
FIG. 2 is a side view of the present invention.
Figure 3:
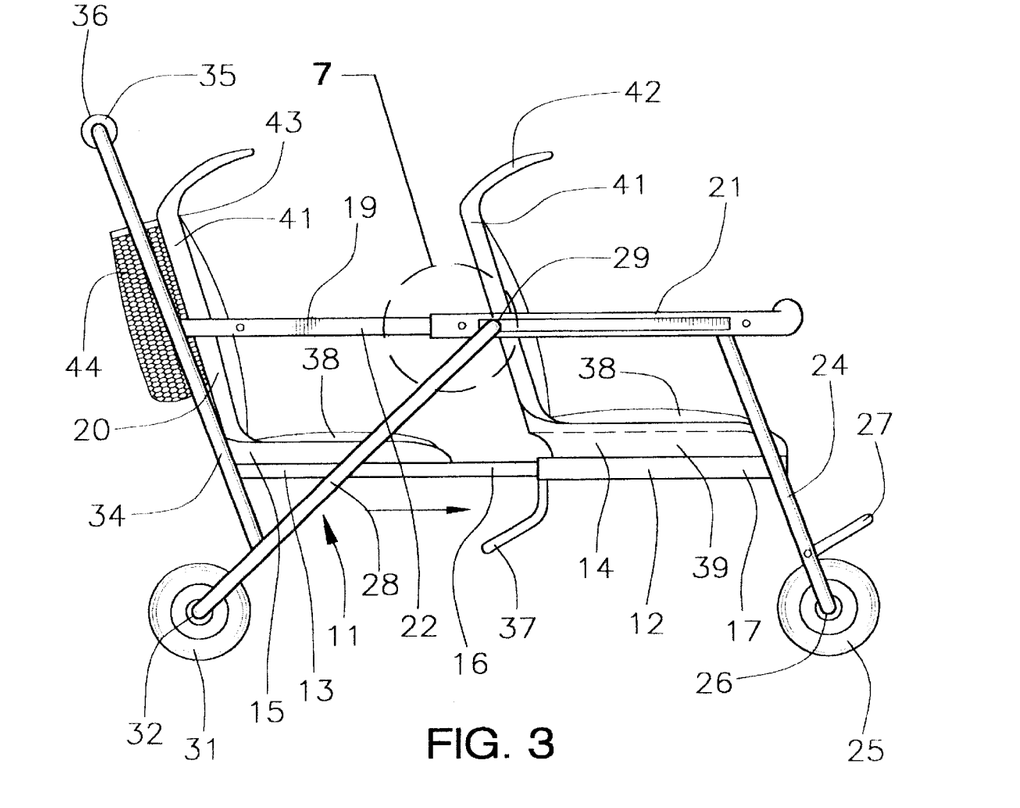
FIG. 3 is a side view of the present invention.
Figure 4:
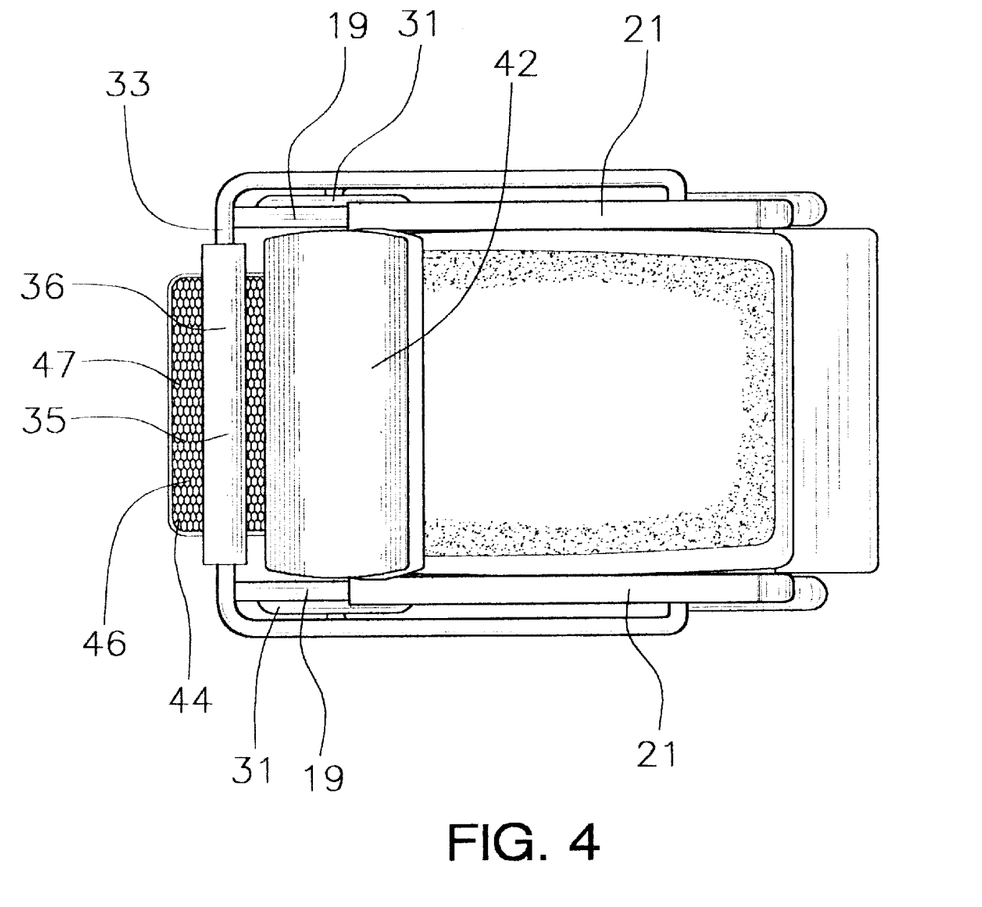
FIG. 4 is a top view of the present invention.
Figure 5:
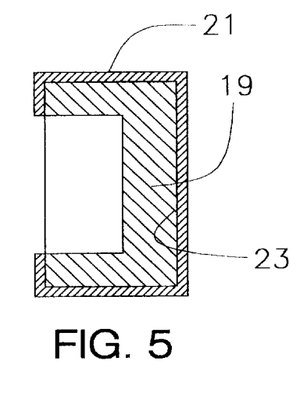
FIG. 5 is a cross-sectional view of the present invention.
Figure 6:
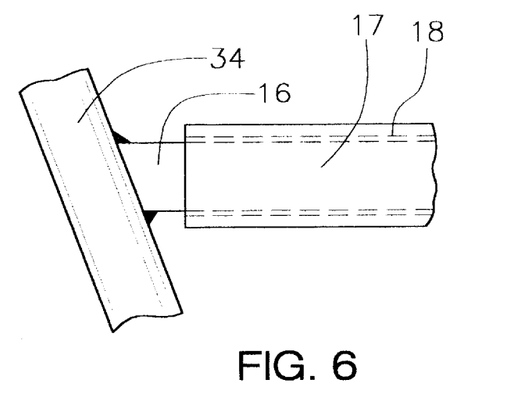
FIG. 6 is a side view of the present invention.
Figures 7, 8:
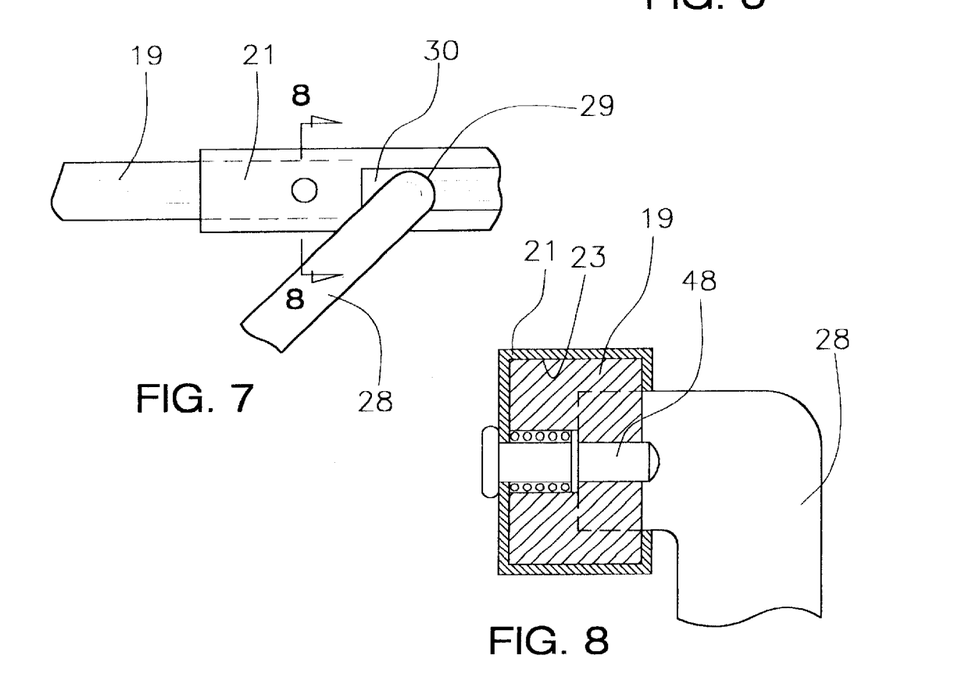
FIG. 7 is a side view of the present invention.
FIG. 8 is a cross-sectional view of the present invention.

With reference now to the drawings, and in particular to FIGS. 1 through 8 thereof, a new expandable stroller embodying the principles and concepts of the present invention and generally designated by the reference numeral 10 will be described.

As best illustrated in FIGS. 1 through 8, the expandable stroller 10 generally includes a frame assembly 11 that has a front portion 12 and a rear portion 13. The front portion 12 is slidably coupled to the rear portion 13 such that a length of the frame assembly 11 is adjustable. A first seat member 14 is coupled to the front portion 12 of the frame assembly 11. The first seat member 14 is adapted for supporting a child in a seated position when a user puts the child in the first seat member 14. A second seat member 15 is coupled to the rear portion 13 of the frame assembly 11. The second seat member 15 is adapted for supporting a second child in a seated position when the user puts the second child in the second seat member 15 when the frame assembly 11 is extended to full length. The first seat member 14 is positionable adjacent the second seat member 15 when the front portion 12 of the frame assembly 11 is slid with respect to the rear portion 13 of the frame assembly 11 such that the frame assembly 11 is adapted for only accommodating one child.

The rear portion 13 of the frame assembly 11 has a pair of support members 16. Each of the support members 16 is coupled to opposing sides of the second seat member 15 such that the support members 16 are for supporting the second seat member 15. The front portion 12 of the frame assembly 11 has a pair of support sleeves 17. Each of the support sleeves 17 has a lumen 18. The lumen 18 of each of the support sleeves 17 slidably receives one of the support members 16 of the rear portion 13 of the frame assembly 11 such that the front portion 12 is slidably positionable between a collapsed position and an extended position with respect to the rear portion 13 of the frame assembly. Each of the support sleeves 17 is coupled to opposing edges of the first seat member 14 such that the support members 16 are for supporting the first seat member 14.

The rear portion 13 of the frame assembly 11 has a pair of arm members 19. Each of the arm members 19 is coupled to a back support 20 of the second seat member 15. The back support 20 may be reclinable to provide further comfort the child. Each of the arm members 19 is adapted for supporting an arm of the second child when the second child is seated in the second seat member 15 and the front portion 12 of the frame assembly 11 is in the extended position. The front portion 12 of the frame assembly 11 has a pair of arm sleeves 21. Each of the arm sleeves 21 is coupled to a rear support 22 of the first seat member 14. The rear support 22 may be reclinable to provide further comfort to the child. Each of the arm sleeves 21 is adapted for supporting an arm of the child when the child is seated in the first seat member 14. Each of the arm sleeves 21 has a bore 23 that extends along a length of each of the arm sleeves 12. The bore 23 of each of the arm sleeves 21 slidably receives one of the arm members 19 of the rear portion 13 of the frame assembly 11 such that the front portion 12 is slidably positionable between a collapsed position and an extended position with respect to the rear portion 13 of the frame assembly 11.

The front portion 12 of the frame assembly 11 has a pair of front support stanchions 24. Each of the front support stanchions 24 downwardly extends from one of the arm members 19 of the front portion 12 of the frame assembly 11. Each of the front support stanchions 24 is adapted for supporting the front portion 12 of the frame assembly 11 on a ground surface.

The frame assembly 11 has a pair of front wheels 25. Each of the front wheels 25 is rotatably coupled to a free end 26 of one of the front support stanchions 24. Each of the front wheels 25 is positioned in front of the first seat member 14 such that each of the front wheels 25 are for supporting the front portion 12 of the frame assembly 11 and the first seat member 14 on the ground surface. Each of the front wheels 25 is adapted for facilitating transition of the frame assembly 11 along the ground surface.

The front portion 12 of the frame assembly 11 has a foot member 27. The foot member 27 is coupled between the front support stanchions 24 such that the foot member 27 is adapted for supporting feet of the child when the child is seated in the first seat member 14.

The rear portion 13 of the frame assembly 11 has a pair of rear support stanchions 28. A proximal end 29 of each of the rear support stanchions 28 is coupled to one of the arm members 19. Each of the arm sleeves 21 of the front portion 12 of the frame assembly 11 has a slot 30. The slot 30 of each of the arm sleeves 21 slidably receives the proximal end 29 of an associated one of the rear support stanchions 28 such that the slot 30 permits the proximal end 29 of the associated one of the rear support stanchions 28 to slide with respect to the front portion 12 of the frame assembly 11 when the front portion 12 of the frame assembly 11 transitions between the extend position and the collapsed position. Each of the rear support stanchions 28 is adapted for supporting the rear portion 13 and the front portion 12 of the frame assembly 11 from the ground surface.

The rear portion 13 of the frame assembly 11 has a pair of rear wheels 31. Each of the rear support stanchions 28 has a distal end 32. Each of the rear wheels 31 is coupled to the distal end 32 of one of the rear support stanchions 28. Each of the rear wheels 31 is adapted for supporting the rear portion 13 and the front portion 12 of the frame assembly 11 from the ground surface.

The frame assembly 11 has a handle portion 33. The handle portion 33 has a pair of side members 34 and a gripping member 35. Each of the side members 34 is coupled to one of the rear support stanchions 28 and an associated one of the arm members 19. The gripping member 35 is coupled between the side members 34 such that the gripping member 35 is adapted to be gripped by hand of the user. The handle portion 33 is adapted for facilitating movement of the frame assembly 11 across the ground surface.

The handle portion 33 of the frame assembly 11 has a pad 36. The pad 36 is positioned around the gripping member 35 of the handle portion 33. The pad 36 is adapted for cushioning the hands of the user when the user is pushing the frame assembly 11.

The first seat member 14 has a foot portion 37. The foot portion 37 is positioned along a bottom rear edge of the first seat member 14. The foot portion 37 is adapted for supporting feet of the second child when the second child is seated in the second seat member 15.

The first seat member 14 has a seat portion 38. The first seat member 14 has a channel 39 positioned below the seat portion 38 of the first seat member 14. The channel 39 of the first seat member has an open end 40 that faces the second seat member 15. The channel 39 is for slidably receiving a seat portion 38 of the second seat member 15 when the first seat member 14 is positioned adjacent the second seat member 15.

The first seat member 14 and the second seat member 15 each have a back portion 41. The back portion 41 of each of the first seat member 14 and the second seat member 15 has a brim 42 that outwardly extends from a top end 43 and the associated back portion 41. The brim 42 of the back portion 41 of the first seat member 14 is adapted for inhibiting contact between the child and the sun when the child is seated on the first seat member 14. The brim 42 of the back portion 41 of the second seat member 15 is adapted for inhibiting contact between the second child and the sun when the second child is seated on the second seat member 15. The brim 42 of the back portion 41 of the first seat member 14 is nestable under the brim 42 of the back portion 41 of the second seat member 15 when the first seat member 14 is positioned adjacent the second seat member 15.

A basket member 44 is coupled to the back portion 41 of the second seat member 15. The basket member 44 has a perimeter wall 45 defining an interior space 46. The interior space 46 of the basket member 44 has an open top aperture 47. The open top aperture 47 is adapted for permitting the user access to the interior space 46 of the basket member 44.

Each of the arm sleeves 21 of the front portion 12 of the frame assembly 11 has a locking pin 48. The locking pin 48 is selectively positioned through an associated one of the arm sleeves 21 into an associated one of the arm members 19 of the rear portion 13 of the frame assembly 11. The locking pin 48 of each of the arm members 19 is for selectively securing the associated one of the arm sleeves 21 with the associated one of the arm members 19 for inhibiting sliding of the front portion 12 of the frame assembly 11 with respect to the rear portion 13 of the frame assembly 11.

In use, the present inventions frame pieces would collapse into themselves in a telescoping manner. When the present invention is fully collapsed, the sliding bar will lock into place at the front of the sliding track. To release it and expand the stroller, a second push button lock near the front of the sliding track would be pushed to release the mechanism, and the user would pull forward on the collapsible frame. This would expand the frame and base, and the sliding bar would slide back along the track until it securely locked into place on the first push button lock.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible child carriage for carrying children, the collapsible child carriage comprising:

a frame assembly having a front portion and a rear portion, said front portion being slidably coupled to said rear portion such that a length of said frame assembly is adjustable;

a first seat member being coupled to said front portion of said frame assembly, said first seat member being adapted for supporting a child in a seated position when a user puts the child in said first seat member;

a second seat member being coupled to said rear portion of said frame assembly, said second seat member being adapted for supporting a second child in a seated position when the user puts the second child in said second seat member when said frame assembly is extended to full length;

said first seat member being positionable adjacent said second seat member when said front portion of said frame assembly is slid with respect to said rear portion of said frame assembly such that said frame assembly is adapted for only accommodating one child; and said first seat member and said second seat member each having a back potion, said back portion of each of said first seat member and said second seat member having a brim outwardly extending from a top end and associated said back portion, said brim of said back portion of said first seat member being adapted for inhibiting contact between the child and the sun when the child is seated on said first seat member, said brim of said back portion of said second seat member being adapted for inhibiting contact between the second child and the sun when the second child is seated on said second seat member, said brim of said back portion of said first seat member being nestable under said brim of said back portion of said second seat member when said first seat member is positioned adjacent said second seat member.

2. The collapsible child carriage as set forth in claim 1, further comprising:

said rear portion of said frame assembly having a pair of support members, each of said support members being coupled to opposing sides of said second seat member such that said support members are for supporting said second seat member; and said front portion of said frame assembly having a pair of support sleeves, each of said support sleeves having a lumen, said lumen of each of said support sleeves slidably receiving one of said support members of said rear portion of said frame assembly such that said first portion is slidably positionable between a collapsed position and an extended position with respect to said rear portion of said frame assembly, each of said support sleeves being coupled to opposing edges of said first seat member such that said support members are for supporting said first seat member.

3. The collapsible child carriage as set forth in claim 1, further comprising:

said rear portion of said frame assembly having a pair of arm members, each of said arm members being coupled to a back support of said second seat member, each of said arm members being adapted for supporting an arm of the second child when the second child is seated in said second seat member and said front portion of said frame assembly is in said extended position; and said front portion of said frame assembly having a pair of arm sleeves, each of said arm sleeves being coupled to a rear support of said first seat member, each of said arm sleeves being adapted for supporting an arm of the child when the child is seated in said first seat member, each of said arm sleeves having a bore extending along a length of each of said arm sleeves, said bore of each of said arm sleeves slidably receiving one of said arm members of said rear portion of said frame assembly such that said front portion is slidably positionable between a collapsed position and an extended position with respect to said rear portion of said frame assembly.

4. The collapsible child carriage as set forth in claim 1, further comprising:

said first seat member having a foot portion, said foot portion being positioned along a bottom rear edge of said first seat member, said foot portion being adapted for supporting feet of the second child when the second child is seated in said second seat member.

5. The collapsible child carriage as set forth in claim 1, further comprising:

said first seat member having a seat portion, said first seat member having a channel positioned below said seat portion of said first seat member, said channel of said first seat member having an open end facing said second seat member, said channel being for slidably receiving a seat portion of said second seat member when said first seat member is positioned adjacent said second seat member.

6. The collapsible child carriage as set forth in claim 1, further comprising:

a basket member being coupled to said back portion of said second seat member, said basket member having a perimeter wall defining an interior space, said interior space of said basket member having an open top aperture, said open top aperture being adapted for permitting the user access to said interior space of said basket member.

7. The collapsible child carriage as set forth in claim 3, further comprising:

said front portion of said frame assembly having a pair of front support stanchions, each of said front support stanchions downwardly extending from one of said arm members of said front portion of said frame assembly, each of said front support stanchions being adapted for supporting said front portion of said frame assembly on a ground surface.

8. The collapsible child carriage as set forth in claim 3, further comprising:

said rear portion of said frame assembly having a pair of rear support stanchions, a proximal end of each of said rear support stanchions being coupled to one of said arm members, each of said arm sleeves of said front portion of said frame assembly having a slot, said slot of each of said arm sleeves slidably receiving said proximal end of an associated one of said rear support stanchions such that said slot permits said proximal end of the associated one of said rear support stanchions to slide with respect to said front portion of said frame assembly when said front portion of said frame assembly transitions between said extend position and said collapsed position, each of said rear support stanchions being adapted for supporting said rear portion and said front portion of said frame assembly from the ground surface.

9. The collapsible child carriage as set forth in claim 3, further comprising:

each of said arm sleeves of said front portion of said frame assembly having a locking pin, said locking pin being selectively positioned through an associated one of said arm sleeves into an associated one of said arm members of said rear portion of said frame member, said locking pin of each of said arm member being for selectively securing the associated one of said arm sleeves with the associated one of said arm members for inhibiting sliding of said front portion of said frame assembly with respect to said rear portion of said frame assembly.

10. The collapsible child carriage as set forth in claim 7, further comprising:

said frame assembly having a pair of front wheels, each of said front wheels being rotatably coupled to a free end of one of said front support stanchions, each of said front wheels being positioned in front of said first seat member such that each of said front wheels are for supporting said front portion of said frame assembly and said first seat member on the ground surface, each of said front wheels being adapted for facilitating transition of said frame assembly along the ground surface.

11. The collapsible child carriage as set forth in claim 7, further comprising:

said front portion of said frame assembly having a foot member, said foot member being coupled between said front support stanchions such that said foot member is adapted for supporting feet of the child when the child is seated in said first seat member.

12. The collapsible child carriage as set forth in claim 8, further comprising:

said rear portion of said frame assembly having a pair of rear wheels, each of said rear support stanchions having a distal end, each of said rear wheels being coupled to said distal end of one of said rear support stanchions, each of said rear wheels being adapted for supporting said rear portion and said front portion of said frame assembly from the ground surface.

13. The collapsible child carriage as set forth in claim 8, further comprising:

said frame assembly having a handle portion, said handle portion having a pair of side members and a gripping member, each of said side members being coupled to one of said rear support stanchions and an associated one of said arm members, said gripping member being coupled between said side members such that said gripping member is adapted for being gripped by hand of the user, said handle portion being adapted for facilitating movement of said frame assembly across the ground surface.

14. The collapsible child carriage as set forth in claim 8, further comprising:

said rear portion of said frame assembly having a pair of rear wheels, each of said rear support stanchions having a distal end, each of said rear wheels being coupled to said distal end of one of said rear support stanchions, each of said rear wheels being adapted for supporting said rear portion and said front portion of said frame assembly from the ground surface.

15. The collapsible child carriage as set forth in claim 13, further comprising:

said handle portion of said frame assembly having a pad, said pad being positioned around said gripping member of said handle portion, said pad being adapted for cushioning the hands of the user when the user is pushing said frame assembly.

16. The collapsible child carriage as set forth in claim 13, further comprising:

said handle portion of said frame assembly having a pad, said pad being positioned around said gripping member of said handle portion, said pad being adapted for cushioning the hands of the user when the user is pushing said frame assembly.

17. A collapsible child carriage for carrying children, the collapsible child carriage comprising:

a frame assembly having a front portion and a rear portion, said front portion being slidably coupled to said rear portion such that a length of said frame assembly is adjustable;

a first seat member being coupled to said front portion of said frame assembly, said first seat member being adapted for supporting a child in a seated position when a user puts the child in said first seat member;

a second seat member being coupled to said rear portion of said frame assembly, said second seat member being adapted for supporting a second child in a seated position when the user puts the second child in said second seat member when said frame assembly is extended to full length;

said first seat member being positionable adjacent said second seat member when said front portion of said frame assembly is slid with respect to said rear portion of said frame assembly such that said frame assembly is adapted for only accommodating one child;

said rear portion of said frame assembly having a pair of arm members, each of said arm members being coupled to a back support of said second seat member, each of said arm members being adapted for supporting an arm of the second child when the second child is seated in said second seat member and said front portion of said frame assembly is in said extended position;

said front portion of said frame assembly having a pair of arm sleeves, each of said arm sleeves being coupled to a rear support of said first seat member, each of said arm sleeves being adapted for supporting an arm of the child when the child is seated in said first seat member, each of said arm sleeves having a bore extending along a length of each of said arm sleeves, said bore of each of said arm sleeves slidably receiving one of said arm members of said rear portion of said frame assembly such that said front portion is slidably positionable between a collapsed position and an extended position with respect to said rear portion of said frame assembly;

said rear portion of said frame assembly having a pair of rear support stanchions, a proximal end of each of said rear support stanchions being coupled to one of said arm members, each of said arm sleeves of said front portion of said frame assembly having a slot, said slot of each of said arm sleeves slidably receiving said proximal end of an associated one of said rear support stanchions such that said slot permits said proximal end of the associated one of said rear support stanchions to slide with respect to said front portion of said frame assembly when said front portion of said frame assembly transitions between said extend position and said collapsed position, each of said rear support stanchions being adapted for supporting said rear portion and said front portion of said frame assembly from the ground surface.

18. The collapsible child carriage as set forth in claim 17, further comprising:

said frame assembly having a handle portion, said handle portion having a pair of side members and a gripping member, each of said side members being coupled to one of said rear support stanchions and an associated one of said arm members, said gripping member being coupled between said side members such that said gripping member is adapted for being gripped by hand of the user, said handle portion being adapted for facilitating movement of said frame assembly across the ground surface.

19. A collapsible child carriage for carrying children, the collapsible child carriage comprising:

a frame assembly having a front portion and a rear portion, said front portion being slidably coupled to said rear portion such that a length of said frame assembly is adjustable;

a first seat member being coupled to said front portion of said frame assembly, said first seat member being adapted for supporting a child in a seated position when a user puts the child in said first seat member;

a second seat member being coupled to said rear portion of said frame assembly, said second seat member being adapted for supporting a second child in a seated position when the user puts the second child in said second seat member when said frame assembly is extended to full length; and said first seat member being positionable adjacent said second seat member when said front portion of said frame assembly is slid with respect to said rear portion of said frame assembly such that said frame assembly is adapted for only accommodating one child;

wherein said rear portion of said frame assembly having a pair of support members, each of said support members being coupled to opposing sides of said second seat member such that said support members are for supporting said second seat member;

said front portion of said frame assembly having a pair of support sleeves, each of said support sleeves having a lumen, said lumen of each of said support sleeves slidably receiving one of said support members of said rear portion of said frame assembly such that said front portion is slidably positionable between a collapsed position and an extended position with respect to said rear portion of said frame assembly, each of said support sleeves being coupled to opposing edges of said first seat member such that said support members are for supporting said first seat member;

wherein said rear portion of said frame assembly having a pair of arm members, each of said arm members being coupled to a back support of said second seat member, each of said arm members being adapted for supporting an arm of the second child when the second child is seated in said second seat member and said front portion of said frame assembly is in said extended position;

said front portion of said frame assembly having a pair of arm sleeves, each of said arm sleeves being coupled to a rear support of said first seat member, each of said arm sleeves being adapted for supporting an arm of the child when the child is seated in said first seat member, each of said arm sleeves having a bore extending along a length of each of said arm sleeves, said bore of each of said arm sleeves slidably receiving one of said arm member of said rear portion of said frame assembly such that said first portion is slidably positionable between a collapsed position and an extended position with respect to said rear portion of said frame assembly;

wherein said front portion of said frame assembly having a pair of front support stanchions, each of said front support stanchions downwardly extending from one of said arm members of said front portion of said frame assembly, each of said front support stanchions being adapted for supporting said front portion of said frame assembly on a ground surface;

wherein said frame assembly having a pair of front wheels, each of said front wheels being rotatably coupled to a free end of one of said front support stanchions, each of said front wheels being positioned in front of said first seat member such that each of said front wheels are for supporting said front portion of said frame assembly and said first seat member on the ground surface, each of said front wheels being adapted for facilitating transition of said frame assembly along the ground surface;

wherein said front portion of said frame assembly having a foot member, said foot member being coupled between said front support stanchions such that said foot member is adapted for supporting feet of the child when the child is seated in said first seat member;

wherein said rear portion of said frame assembly having a pair of rear support stanchions, a proximal end of each of said rear support stanchions being coupled to one of said arm members, each of said arm sleeves of said front portion of said frame assembly having a slot, said slot of each of said arm sleeves slidably receiving said proximal end of an associated one of said rear support stanchions such that said slot permits said proximal end of the associated one of said rear support stanchions to slide with respect to said front portion of said frame assembly when said front portion of said frame assembly transitions between said extend position and said collapsed position, each of said rear support stanchions being adapted for supporting said rear portion and said front portion of said frame assembly from the ground surface;

wherein said rear portion of said frame assembly having a pair of rear wheels, each of said rear support stanchions having a distal end, each of said rear wheels being coupled to said distal end of one of said rear support stanchions, each of said rear wheels being adapted for supporting said rear portion and said front portion of said frame assembly from the ground surface;

wherein said frame assembly having a handle portion, said handle portion having a pair of side members and a gripping member, each of said side members being coupled to one of said rear support stanchions and an associated one of said arm members, said gripping member being coupled between said side members such that said gripping member is adapted for being gripped by hand of the user, said handle portion being adapted for facilitating movement of said frame assembly across the ground surface;

wherein said handle portion of said frame assembly having a pad, said pad being positioned around said gripping member of said handle portion, said pad being adapted for cushioning the hands of the user when the user is pushing said frame assembly;

wherein said first seat member having a foot portion, said foot portion being positioned along a bottom rear edge of said first seat member, said foot portion being adapted for supporting feet of the second child when the second child is seated in said second seat member;

wherein said first seat member having a seat portion, said first seat member having a channel positioned below said seat portion of said first seat member, said channel of said first seat portion having an open end facing said second seat member, said channel being for slidably receiving a seat portion of said second seat member when said first seat member is positioned adjacent said second seat member;

wherein said first seat member and said second seat member each having a back potion, said back portion of each of said first seat member and said second seat member having a brim outwardly extending from a top end and associated said back portion, said brim of said back portion of said first seat member being adapted for inhibiting contact between the child and the sun when the child is seated on said first seat member, said brim of said back portion of said second seat member being adapted for inhibiting contact between the second child and the sun when the second child is seated on said second seat member, said brim of said back portion of said first seat member being nestable under said brim of said back portion of said second seat member when said first seat member is positioned adjacent said second seat member;

wherein a basket member being coupled to said back portion of said second seat member, said basket member having a perimeter wall defining an interior space, said interior space of said basket member having an open top aperture, said open top aperture being adapted for permitting the user access to said interior space of said basket member;

wherein each of said arm sleeves of said front portion of said frame assembly having a locking pin, said locking pin being selectively positioned through an associated one of said arm sleeves into an associated one of said arm members of said rear portion of said frame member, said locking pin of each of said arm member being for selectively securing the associated one of said arm sleeves with the associated one of said arm members for inhibiting sliding of said front portion of said frame assembly with respect to said rear portion of said frame assembly.

* * * * *